(12) United States Patent
Mintgen et al.

(10) Patent No.: US 6,170,806 B1
(45) Date of Patent: Jan. 9, 2001

(54) PISTON/CYLINDER ASSEMBLY

(75) Inventors: Rolf Mintgen, Thür; Castor Fuhrmann, Brachtendorf; Oliver Greb, Neunkirchen, all of (DE)

(73) Assignee: Stabilus GmbH, Koblenz (DE)

( * ) Notice: Under 35 U.S.C. 154(b), the term of this patent shall be extended for 0 days.

(21) Appl. No.: 09/176,400

(22) Filed: Oct. 21, 1998

(30) Foreign Application Priority Data

Oct. 23, 1997 (DE) .............................. 197 46 828

(51) Int. Cl.$^7$ ................................................ F16F 5/00
(52) U.S. Cl. ........................................ 267/64.11; 267/124
(58) Field of Search ............................. 267/64.11, 115, 267/124, 129; 92/88

(56) References Cited

U.S. PATENT DOCUMENTS

| | | | | |
|---|---|---|---|---|
| 1,027,288 | * | 5/1912 | Sherman ................. | 267/65 |
| 2,520,406 | * | 8/1950 | Hollingsworth .......... | 280/277 |
| 4,373,599 | * | 2/1983 | Walter et al. ........... | 180/148 |
| 4,406,215 | * | 9/1983 | Lacasse .................. | 92/85 R |
| 4,685,383 | | 8/1987 | Ruchser . | |
| 5,299,489 | * | 4/1994 | Obrecht et al. .......... | 92/5 R |

FOREIGN PATENT DOCUMENTS

| | | | |
|---|---|---|---|
| 6945901 U | * | 11/1969 | (DE) . |
| 34 29 783 | | 2/1986 | (DE) . |
| 34 35 027 | | 4/1986 | (DE) . |

* cited by examiner

Primary Examiner—Christopher P. Schwartz
Assistant Examiner—Bradley King
(74) Attorney, Agent, or Firm—Baker Botts L.L.P.

(57) ABSTRACT

A piston/cylinder assembly includes a cylinder and a piston received in the cylinder for axial movement and dividing the cylinder into two working chambers. A first connecting member is affixed to the cylinder and is adapted to connect the cylinder to one of two elements that are movable relative to each other. At least one second connecting member is operatively coupled to the piston, extends through an opening in the cylinder, and is adapted to connect the piston to the other of the two elements. The opening has a length axially of the cylinder that is not less than the length of the stroke of the piston.

4 Claims, 3 Drawing Sheets

PISTON/CYLINDER ASSEMBLY

BACKGROUND OF THE INVENTION

The invention concerns piston/cylinder assemblies.

As a rule, a piston/cylinder assembly consists of a cylinder and a piston that is received for sliding movement along the cylinder and is affixed to a piston rod that extends out of the cylinder. Connecting members on the cylinder and on the outer end of the piston rod serve to connect the piston/cylinder to elements that are axially movable relative to one another.

A vibration damper for a motor vehicle chassis is an example of a piston/cylinder assembly. A fundamental problem with vibration dampers is the production of a large damping force with small cylinder diameters. One possibility is to use relatively thick piston rods whose displacing volume figures significantly in the calculation of damping forces. However, doing so is associated with a requirement for considerable radial installation space since the piston rod also requires a piston rod guide and piston rod seal. Moreover, an equalization chamber must also be present for the displacing volume, which further increases the space requirement.

A similar problem exists for gas springs. The principal structure is comparable to a vibration damper. Rather than a damping force, a compression or tension force is intended to be available for use, which is calculated from the area of the piston rod cross section exposed to pressure multiplied by the operating pressure in the cylinder. In this application, too, a large piston rod diameter is desirable on the one hand, but is limited by the installation space generally available.

SUMMARY OF THE INVENTION

An object of the present invention is to provide a piston/cylinder assembly that makes possible maximum utilization of operating force with as little installation space as possible.

The object is attained, in accordance with the invention, by a piston/cylinder assembly that includes a cylinder and a piston received in the cylinder for axial movement and dividing the cylinder into two working chambers. A first connecting member is affixed to the cylinder and is adapted to connect the cylinder to one of two elements that are movable relative to each other. At least one second connecting member is operatively coupled to the piston, extends through an opening in the cylinder, and is adapted to connect the piston to the other of the two elements. The opening in the cylinder has a length axially of the cylinder that is not less than the length of the stroke of the piston.

As a consequence of the principle of the invention, the piston has a relatively long guideway in the cylinder. In order to avoid the effect of undesired transverse forces, several connecting members can be arranged in circumferentially spaced-apart relation on the piston. When there are several connecting members, particularly when they are arranged symmetrically, the transverse forces counterbalance one another, thus reducing or eliminating transverse (lateral) loads on the piston.

In another embodiment, the opening has offset sections in the circumferential direction that form a guide frame for the connecting member on the piston. By this means, a rotary motion of the piston can also be effected via the piston stroke and thus a rotary motion of the components attached to the piston/cylinder assembly.

With a view to good guidance of the piston in its movements along the cylinder and to low weight, the piston is designed as a tubular body with a base.

When the piston/cylinder assembly is used as a locking element, the piston has at least one flow connection between the working chambers, of which at least one can be at least partially closed via a control unit in conjunction with a valve. The control unit can be actuated radially in the piston from outside of the cylinder. In comparison to a design with a hollow piston rod, the control unit can be made much shorter. As a result, there are also smaller inaccuracies in the guidance of the control unit.

Even though the control unit acts radially, the flow connection that can be closed by the control unit is designed to be essentially axial to the longitudinal axis of the piston. Thus, the shortest connection between the working chambers is available. Moreover, the flow connections are arranged in the base of the piston and open to the space within the tubular body. The intent of this measure is to reduce the throttling effect originating from the length of the flow connection. This feature is important, especially in piston/cylinder assemblies that must always be equally ready for operation even at low temperatures in winter.

When the piston/cylinder assembly is used as a gas spring, one working chamber is filled with a pressure medium, specifically gas, and the other working chamber has a vent open to the outside of the cylinder.

To modify the operating characteristic curves, for example, the damping force characteristic curve in a vibration damper or the spring force characteristic curve in a gas spring, a spring is arranged in at least one working chamber and exerts a force that acts upon the piston as a function of the ratio of the spring length to the stroke length. To be especially compact, the spring can be arranged within the tubular body of the piston.

DESCRIPTION OF THE DRAWINGS

For a more complete understanding of the present invention, and the advantages thereof, reference may be made to the following written description of exemplary embodiments, taken in conjunction with the accompanying drawings.

DESCRIPTION OF THE EMBODIMENTS

Figure 1:
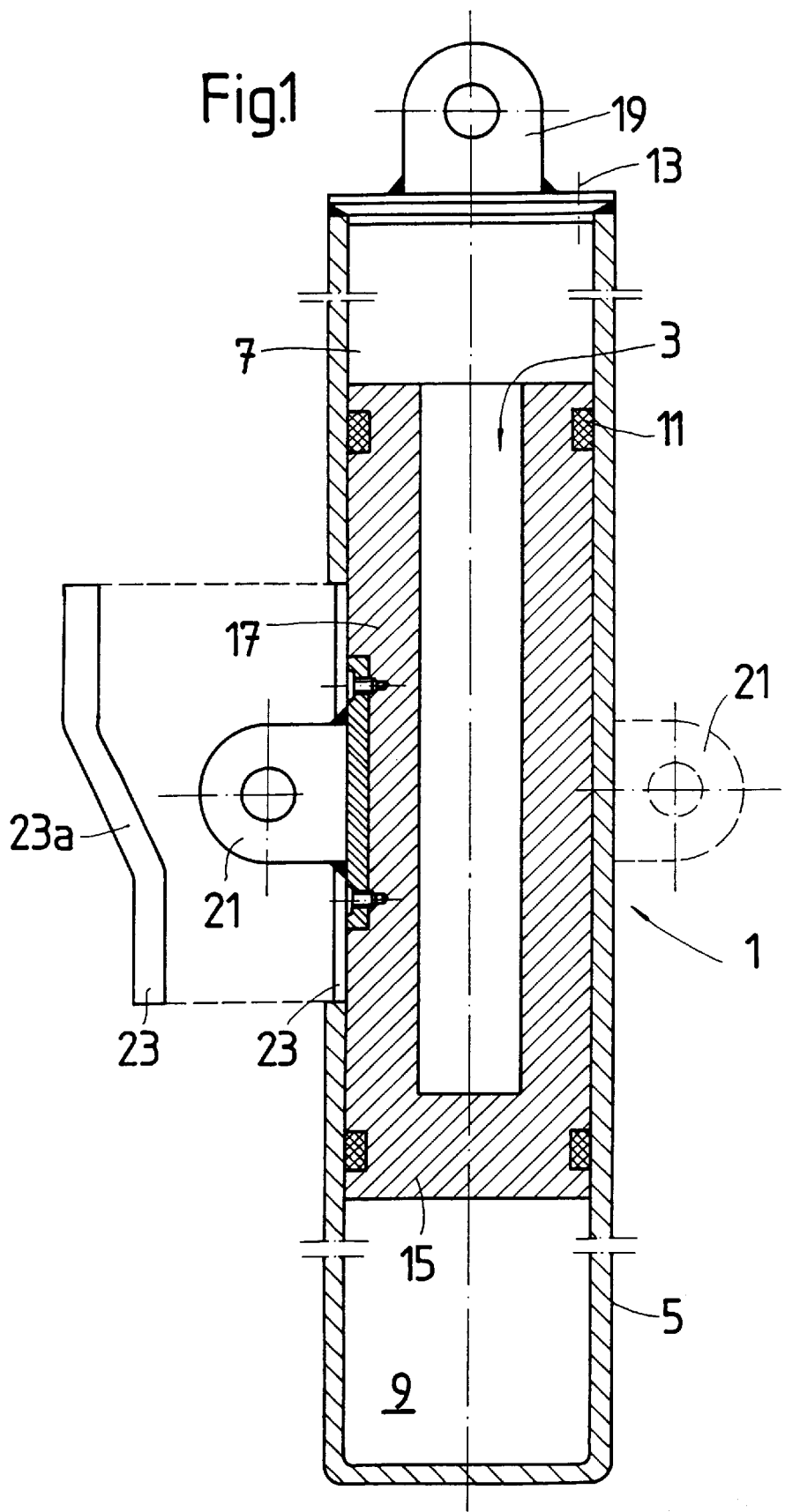
FIG. 1 is a piston/cylinder assembly for a gas spring.

FIG. 1 shows a piston/cylinder assembly 1 in the embodiment of a gas spring. A piston 3 divides a cylinder 5 into an upper working chamber 7 and a lower working chamber 9. The two working chambers are separated by at least one piston ring 11. The lower working chamber 9 is filled with a pressure medium, for example, gas. The upper working chamber is at atmospheric pressure, since a vent cross section 13 creates a connection to the outside of the cylinder. The entire cross section of the piston is available for the operating force of the gas spring.

The piston of the piston/cylinder assembly consists of a base 15 and a tubular body 17. The guide function is assumed by the tubular body and the separation function by the base.

In order to join the piston/cylinder assembly to two elements that are movable relative to one another, such as gates, windows and the like, a first connecting member 19 is provided on the cylinder. A second connecting member 21 engages the piston 3 through a side opening 23. The opening is at least as long as the stroke of the piston. For assembly, the connecting member 21 may be fastened to the piston by screws.

If it is appropriate for an application, the opening can be designed as a guide frame that has offset sections 23a in the circumferential direction of the cylinder. (In FIG. 1, the opening 23 is shown to the left as an orthogonal projection.) By this means, the piston can execute as a function of its stroke length a rotary motion which then leads to a rotary motion of the two components attached to the connecting members as well. In addition, several connecting members spaced apart in the circumferential direction can also be used for compensation of transverse forces, one such additional connecting member 21 being shown on the right side of the assembly 1 in FIG. 1 in phantom lines.

Figure 2:
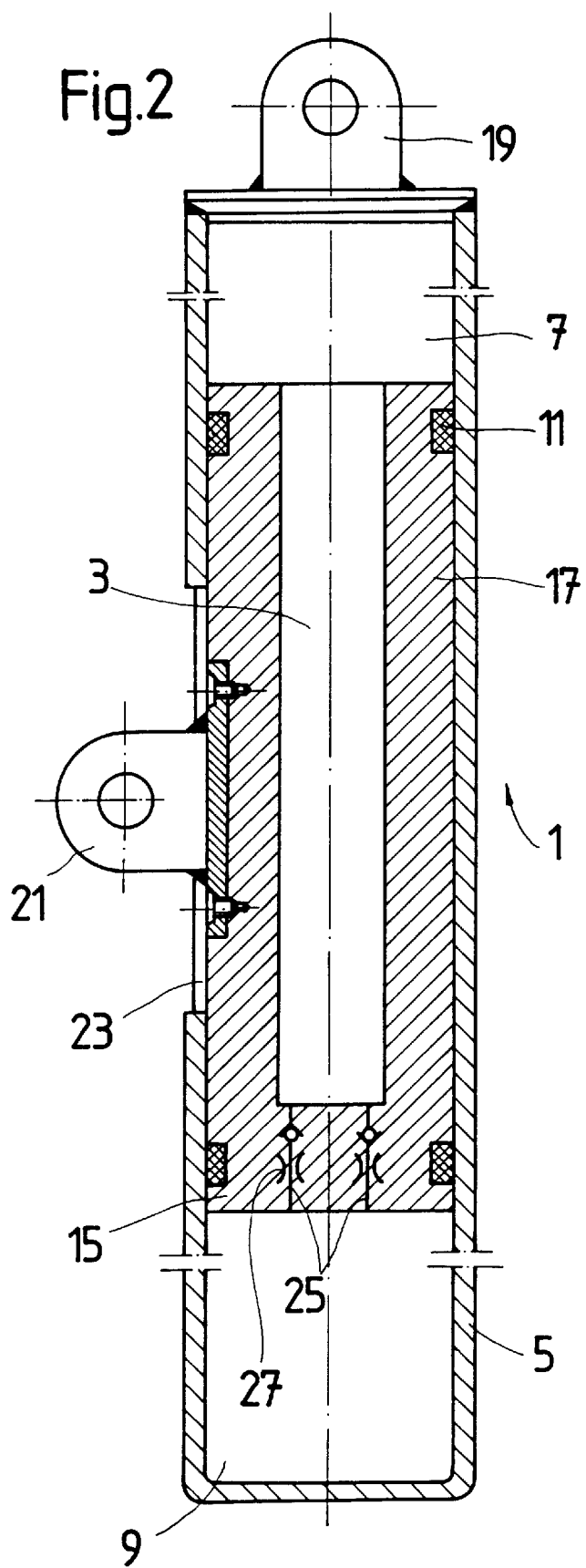
FIG. 2 is a piston/cylinder assembly for a vibration damper.

FIG. 2 shows a vibration damper having a piston 3 and cylinder 5 that are identical to the piston/cylinder assembly of FIG. 1 with regard to the connecting members. Both working chambers 7 and 9 are filled completely with a damping medium, specifically oil. Present between the working chambers is at least one flow connection 25, which forms an entrance to a damping mechanism 27. In order to keep the effect of the overall length of the flow connection on the throttle effect as small as possible, the flow connection 25 is provided in the base 15 of the piston 3.

During a stroke motion of the piston, a damping volume corresponding to the stroke length multiplied by the piston cross section is available. The entire damping volume is pumped between the two working chambers 7 and 9 so that no equalization chamber is required. To the extent that a fraction of the volume is displaced from one working chamber, the other working chamber expands by exactly this volume fraction. The same damping volume is on hand for both directions of motion. Moreover, the throttling of the damping mechanism 27 can be very strong since no cavitation can occur, as can happen in, for example, the upper working chamber in an over-damped dual tube damper.

Figure 3:
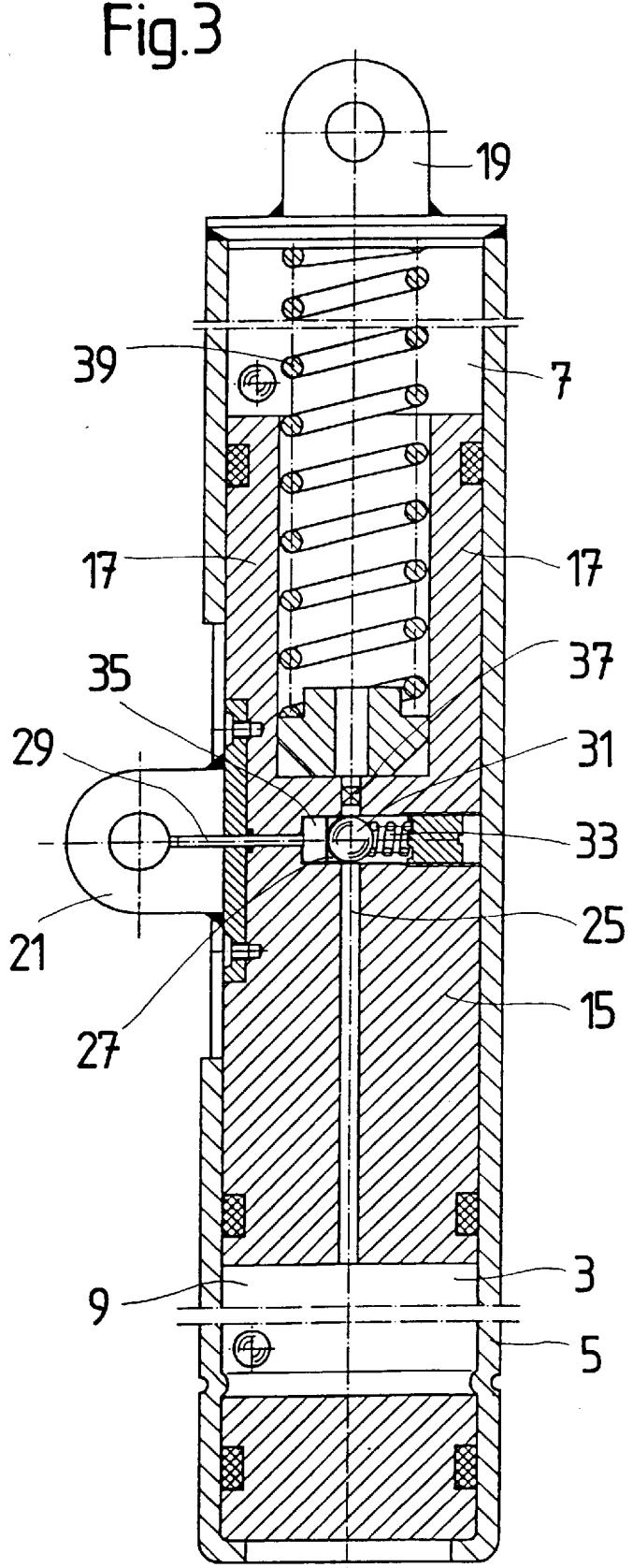
FIG. 3 is a piston/cylinder assembly with a locking function.

The embodiment in accordance with FIG. 3 represents a variation of FIG. 2. Just as in FIG. 2, both working chambers of the cylinder 5 are filled with a fluid. Furthermore, a flow connection 25 also exists between the working chambers 7 and 9.

The essential functional difference is that the flow connection can be actuated by a valve 27 via a control rod 29 from outside the cylinder 5. The control rod 29 extends radially on a valve body 31, which is preloaded by a valve spring 33 in the direction of closing. A flange 35 on the control rod serves as a stop for the locking function of the valve 27. The advantage of radial valve actuation is that, in comparison to known locking valves, only a small force is required to open the valve since the operating pressure present in the assembly does not directly oppose the opening motion.

Arranged within the flow connection is a dynamic pressure valve 37 that causes a blocking of the piston movement above a threshold dynamic pressure value in one of the working chambers, independent of the position of the valve 27. The dynamic pressure valve can consist, for example, of a body that is spring-loaded in the direction of opening and can be pressed by a high dynamic pressure onto a valve seat surface against the spring pressure. A dynamic pressure valve can of course be used for both flow directions. Applications exist, for example, in seat adjustment devices in a motor vehicle, where the current seat adjustment is preserved in an accident even by an unlocked piston cylinder assembly.

In addition to the embodiments in accordance with FIG. 1 and FIG. 2, a pressure spring 39 can be used which preloads the piston in one direction. The pressure spring is guided in the tubular body 17 of the piston 3 and can bear against its base 15. Relatively long springs with a small spring rate can be used since the danger of buckling is relatively small due to the guidance in the tubular body. Alternatively, and not shown in this embodiment, a pressurized gas chamber can also be used that is separated from a working chamber by a separating piston.

What is claimed is:

1. A piston/cylinder assembly, comprising a cylinder;

an elongated piston received in the cylinder for axial movement through a piston stroke, the piston having a seal adjacent each end and dividing the cylinder into two working chambers, one adjacent each end of the piston, a first connecting member affixed to the cylinder and adapted to connect the cylinder to one of two elements that are movable relative to each other;

at least one second connecting member operatively coupled to the piston, each second connecting member extending through an opening in the cylinder located between the two working chambers and adapted to connect the piston to the other of the two elements, the opening having a length axially of the cylinder that is not less than the length of the piston stroke, the seals being located such that they are spaced apart from the opening in the cylinder in all positions of the piston during the piston stroke, and the opening having portions that are offset in the circumferential direction from each other and form a guideway frame for the second connecting member on the piston so as to impart rotation of the piston in the circumferential direction.

2. The piston/cylinder assembly according to claim 1, wherein there is a plurality of second connecting members that are spaced apart from each other circumferentially of the piston.

3. The piston/cylinder assembly according to claim 1, wherein the piston has a tubular body and a base.

4. The piston/cylinder assembly according to claim 1, wherein one working chamber is filled with a gas under a pressure above atmospheric pressure, and the other working chamber has a vent opening to the outside of the cylinder.

* * * * *